United States Patent
Dunaisky et al.

(10) Patent No.: US 9,530,189 B2
(45) Date of Patent: Dec. 27, 2016

(54) ALTERNATE REDUCTION RATIOS AND THRESHOLD MECHANISMS FOR FRAMEBUFFER COMPRESSION

(71) Applicant: NVIDIA Corporation, Santa Clara, CA (US)

(72) Inventors: Jonathan Dunaisky, Fort Collins, CO (US); David Kirk McAllister, Holladay, UT (US); Steven E. Molnar, Chapel Hill, NC (US); Narayan Kulshrestha, Fremont, CA (US); Rui Bastos, Porto Alegre (BR); Joseph Detmer, Durham, NC (US); William Craig McKnight, Harvest, AL (US)

(73) Assignee: NVIDIA CORPORATION, Santa Clara, CA (US)

( * ) Notice: Subject to any disclaimer, the term of this patent is extended or adjusted under 35 U.S.C. 154(b) by 299 days.

(21) Appl. No.: 13/727,965

(22) Filed: Dec. 27, 2012

(65) Prior Publication Data
US 2013/0249897 A1 Sep. 26, 2013

Related U.S. Application Data

(63) Continuation-in-part of application No. 12/651,357, filed on Dec. 31, 2009, now Pat. No. 8,605,104.

(51) Int. Cl.
*G06T 15/30* (2011.01)
*G09G 5/00* (2006.01)
(Continued)

(52) U.S. Cl.
CPC ............... *G06T 5/002* (2013.01); *G06T 9/00* (2013.01); *G09G 5/363* (2013.01); *H04N 19/426* (2014.11);
(Continued)

(58) Field of Classification Search
USPC ............... 345/418–419, 423, 428, 581, 589, 586,345/606, 611–614, 501, 503, 505, 545, 549,345/552, 555; 382/167, 168, 172, 218–221, 382/225, 232, 234–235, 254, 272, 274, 276, 382/305, 307; 358/518–519, 525, 539, 426.13, 358/426.14, 448, 453
See application file for complete search history.

(56) References Cited

U.S. PATENT DOCUMENTS 5,032,903 A    7/1991   Suzuki et al.
5,081,594 A    1/1992   Horsley
(Continued)

FOREIGN PATENT DOCUMENTS

EP    2143280       1/2010
TW    200820131    5/2008

*Primary Examiner* — Wesner Sajous

(57) ABSTRACT

A method for compressing framebuffer data is presented. The method includes determining a reduction ratio for framebuffer data in a tile including multiple samples. The reduction ratio determined is independent of the sampling mode, where the sampling mode is the number of samples within each pixel in the tile. The method further includes comparing a first portion of the framebuffer data for each of the multiple samples to determine an equality comparison result and also comparing a second portion of the framebuffer data for each one of the multiple samples to compute per-channel differences for each one of the multiple samples and testing the per-channel differences against a threshold value to determine a threshold comparison result. Finally, the method comprises compressing the framebuffer data for the tile based on the reduction ratio, the equality comparison result and the threshold comparison result to produce output framebuffer data for the tile.

27 Claims, 11 Drawing Sheets

(51) Int. Cl.

| | |
|---|---|
| *G09G 5/02* | (2006.01) |
| *G03F 3/08* | (2006.01) |
| *G06K 9/00* | (2006.01) |
| *G06K 9/40* | (2006.01) |
| *G06K 9/36* | (2006.01) |
| *G09G 5/36* | (2006.01) |
| *G06T 5/00* | (2006.01) |
| *G06T 9/00* | (2006.01) |
| *H04N 19/426* | (2014.01) |
| *G09G 5/39* | (2006.01) |

(52) U.S. Cl.
CPC ............ *G09G 5/39* (2013.01); *G09G 2340/02* (2013.01); *G09G 2340/10* (2013.01); *G09G 2360/06* (2013.01); *G09G 2360/121* (2013.01); *G09G 2360/122* (2013.01)

(56) References Cited

U.S. PATENT DOCUMENTS

| | | |
|---|---|---|
| 5,287,438 A | 2/1994 | Kelleher |
| 5,313,287 A | 5/1994 | Barton |
| 5,335,322 A | 8/1994 | Mattison |
| 5,392,396 A | 2/1995 | Macinnis |
| 5,432,898 A | 7/1995 | Curb et al. |
| 5,446,836 A | 8/1995 | Lentz et al. |
| 5,452,104 A | 9/1995 | Lee |
| 5,452,412 A | 9/1995 | Johnson, Jr. et al. |
| 5,483,258 A | 1/1996 | Cornett et al. |
| 5,570,463 A | 10/1996 | Dao |
| 5,594,854 A | 1/1997 | Baldwin et al. |
| 5,623,692 A | 4/1997 | Priem et al. |
| 5,633,297 A | 5/1997 | Valko et al. |
| 5,664,162 A | 9/1997 | Dye |
| 5,748,904 A | 5/1998 | Huang et al. |
| 5,815,162 A | 9/1998 | Levine |
| 5,854,631 A | 12/1998 | Akeley et al. |
| 5,854,637 A | 12/1998 | Sturges |
| 5,872,902 A | 2/1999 | Kuchkuda et al. |
| 5,977,987 A | 11/1999 | Duluk, Jr. |
| 5,990,904 A | 11/1999 | Griffin |
| 6,028,608 A | 2/2000 | Jenkins |
| 6,034,699 A | 3/2000 | Wong et al. |
| 6,072,500 A | 6/2000 | Foran et al. |
| 6,104,407 A | 8/2000 | Aleksic et al. |
| 6,104,417 A | 8/2000 | Nielsen et al. |
| 6,115,049 A | 9/2000 | Winner et al. |
| 6,118,394 A | 9/2000 | Onaya |
| 6,128,000 A | 10/2000 | Jouppi et al. |
| 6,137,918 A | 10/2000 | Harrington et al. |
| 6,160,559 A | 12/2000 | Omtzigt |
| 6,188,394 B1 | 2/2001 | Morein et al. |
| 6,201,545 B1 | 3/2001 | Wong et al. |
| 6,204,859 B1 | 3/2001 | Jouppi et al. |
| 6,219,070 B1 | 4/2001 | Baker et al. |
| 6,249,853 B1 | 6/2001 | Porterfield |
| 6,359,623 B1 | 3/2002 | Larson |
| 6,362,819 B1 | 3/2002 | Dalal et al. |
| 6,366,289 B1 | 4/2002 | Johns |
| 6,429,877 B1 | 8/2002 | Stroyan |
| 6,437,780 B1 | 8/2002 | Baltaretu et al. |
| 6,452,595 B1 | 9/2002 | Montrym et al. |
| 6,469,707 B1 | 10/2002 | Voorhies |
| 6,490,058 B1 | 12/2002 | Takabatake et al. |
| 6,501,564 B1 | 12/2002 | Schramm et al. |
| 6,504,542 B1 | 1/2003 | Voorhies et al. |
| 6,522,329 B1 | 2/2003 | Ihara et al. |
| 6,525,737 B1 | 2/2003 | Duluk, Jr. et al. |
| 6,529,207 B1 | 3/2003 | Landau et al. |
| 6,606,093 B1 | 8/2003 | Gossett et al. |
| 6,614,444 B1 | 9/2003 | Duluk, Jr. et al. |
| 6,624,823 B2 | 9/2003 | Deering |
| 6,633,197 B1 | 10/2003 | Sutardja |
| 6,633,297 B2 | 10/2003 | McCormack et al. |
| 6,646,639 B1 | 11/2003 | Greene et al. |
| 6,664,961 B2 * | 12/2003 | Ray et al. ..................... 345/424 |
| 6,671,000 B1 | 12/2003 | Cloutier |
| 6,683,979 B1 | 1/2004 | Walker et al. |
| 6,693,637 B2 | 2/2004 | Koneru et al. |
| 6,693,639 B2 | 2/2004 | Duluk, Jr. et al. |
| 6,697,063 B1 | 2/2004 | Zhu |
| 6,704,026 B2 | 3/2004 | Kurihara et al. |
| 6,717,578 B1 | 4/2004 | Deering |
| 6,741,247 B1 | 5/2004 | Fenney |
| 6,747,057 B2 | 6/2004 | Ruzafa et al. |
| 6,765,575 B1 | 7/2004 | Voorhies et al. |
| 6,778,177 B1 | 8/2004 | Furtner |
| 6,788,301 B2 | 9/2004 | Thrasher |
| 6,798,410 B1 | 9/2004 | Redshaw et al. |
| 6,819,332 B2 | 11/2004 | Baldwin |
| 6,825,847 B1 | 11/2004 | Molnar et al. |
| 6,833,835 B1 | 12/2004 | van Vugt |
| 6,906,716 B2 | 6/2005 | Moreton et al. |
| 6,940,514 B1 | 9/2005 | Wasserman et al. |
| 6,947,057 B2 | 9/2005 | Nelson et al. |
| 6,978,317 B2 | 12/2005 | Anantha et al. |
| 7,009,607 B2 | 3/2006 | Lindholm et al. |
| 7,009,615 B1 | 3/2006 | Kilgard et al. |
| 7,064,771 B1 | 6/2006 | Jouppi et al. |
| 7,075,681 B1 | 7/2006 | Brothers |
| 7,081,902 B1 | 7/2006 | Crow et al. |
| 7,119,809 B1 | 10/2006 | McCabe |
| 7,126,600 B1 | 10/2006 | Fowler et al. |
| 7,154,066 B2 | 12/2006 | Talwar et al. |
| 7,158,148 B2 | 1/2007 | Toji et al. |
| 7,170,515 B1 | 1/2007 | Zhu |
| 7,184,040 B1 | 2/2007 | Tzvetkov |
| 7,224,364 B1 | 5/2007 | Yue et al. |
| 7,307,628 B1 | 12/2007 | Goodman et al. |
| 7,382,368 B1 | 6/2008 | Molnar et al. |
| 7,403,212 B2 | 7/2008 | Schick et al. |
| 7,453,466 B2 | 11/2008 | Hux et al. |
| 7,479,965 B1 | 1/2009 | King et al. |
| 7,548,996 B2 | 6/2009 | Baker et al. |
| 7,551,174 B2 | 6/2009 | Iourcha et al. |
| 7,692,659 B1 | 4/2010 | Molnar et al. |
| 7,791,617 B2 | 9/2010 | Crow et al. |
| 8,031,977 B2 | 10/2011 | Min et al. |
| 8,063,903 B2 | 11/2011 | Vignon et al. |
| 8,116,579 B2 | 2/2012 | Fenney et al. |
| 8,427,487 B1 | 4/2013 | Crow |
| 8,605,104 B1 * | 12/2013 | McAllister et al. .......... 345/589 |
| 8,660,347 B2 * | 2/2014 | Tamura ....................... 382/167 |
| 8,670,613 B2 | 3/2014 | McAllister et al. |
| 2001/0005209 A1 | 6/2001 | Lindholm et al. |
| 2001/0038642 A1 | 11/2001 | Alvarez et al. |
| 2002/0050979 A1 | 5/2002 | Oberoi et al. |
| 2002/0097241 A1 | 7/2002 | McCormack et al. |
| 2002/0114461 A1 | 8/2002 | Shimada |
| 2002/0140655 A1 | 10/2002 | Liang et al. |
| 2002/0158885 A1 | 10/2002 | Brokenshire et al. |
| 2002/0196251 A1 | 12/2002 | Duluk, Jr. et al. |
| 2003/0020741 A1 | 1/2003 | Boland |
| 2003/0067468 A1 | 4/2003 | Duluk, Jr. et al. |
| 2003/0076325 A1 | 4/2003 | Thrasher |
| 2003/0122815 A1 | 7/2003 | Deering |
| 2003/0194116 A1 | 10/2003 | Wong et al. |
| 2003/0201994 A1 | 10/2003 | Taylor et al. |
| 2004/0086177 A1 | 5/2004 | Zhang et al. |
| 2004/0183801 A1 | 9/2004 | Deering |
| 2004/0196285 A1 | 10/2004 | Rice et al. |
| 2004/0207642 A1 | 10/2004 | Crisu et al. |
| 2004/0246251 A1 | 12/2004 | Fenney et al. |
| 2005/0030314 A1 | 2/2005 | Dawson |
| 2005/0041037 A1 | 2/2005 | Dawson |
| 2005/0066148 A1 | 3/2005 | Luick |
| 2005/0134588 A1 | 6/2005 | Aila et al. |
| 2005/0134603 A1 | 6/2005 | Iourcha et al. |
| 2005/0179698 A1 | 8/2005 | Vijayakumar et al. |
| 2005/0213128 A1 | 9/2005 | Imai et al. |
| 2005/0259100 A1 | 11/2005 | Teruyama |
| 2006/0170690 A1 | 8/2006 | Leather |
| 2006/0170703 A1 | 8/2006 | Liao |

(56) References Cited

U.S. PATENT DOCUMENTS

| | | |
|---|---|---|
| 2006/0203005 A1 | 9/2006 | Hunter |
| 2006/0245001 A1 | 11/2006 | Lee et al. |
| 2007/0139440 A1 | 6/2007 | Crow et al. |
| 2007/0268298 A1 | 11/2007 | Alben et al. |
| 2008/0024497 A1 | 1/2008 | Crow et al. |
| 2008/0100618 A1 | 5/2008 | Woo et al. |
| 2008/0247641 A1 | 10/2008 | Rasmusson et al. |
| 2008/0273218 A1 | 11/2008 | Kitora et al. |
| 2009/0080531 A1 | 3/2009 | Hashiguchi et al. |
| 2009/0295816 A1 | 12/2009 | Kallio |
| 2010/0060629 A1 | 3/2010 | Rasmusson et al. |
| 2012/0050303 A1 | 3/2012 | McAllister et al. |
| 2012/0113787 A1* | 5/2012 | Komma et al. ............... 369/100 |
| 2012/0183215 A1 | 7/2012 | Van Hook et al. |
| 2013/0021352 A1 | 1/2013 | Wyatt et al. |
| 2014/0184612 A1 | 7/2014 | Dunaisky et al. |
| 2014/0184627 A1 | 7/2014 | Dunaisky et al. |

\* cited by examiner

ALTERNATE REDUCTION RATIOS AND THRESHOLD MECHANISMS FOR FRAMEBUFFER COMPRESSION

CROSS-REFERENCE TO RELATED APPLICATIONS

This application is a continuation-in-part of co-pending U.S. patent application Ser. No. 12/651,357 "THRESHOLD-BASED LOSSY REDUCTION COLOR COMPRESSION", David K. McAllister, filed Dec. 31, 2009, which is hereby incorporated by reference in its entirety.

FIELD OF THE INVENTION

Embodiments according to the present invention generally relate to graphics processing and more specifically to compression of color data.

BACKGROUND OF THE INVENTION

Three dimensional graphics processing applications require the storage and processing of large amounts of data. In particular, color information and other information, e.g., stencil and depth data, that is typically stored in the framebuffer takes up a large amount of memory. In addition, the time it takes to transfer color data from memory to a graphics processor can negatively affect the ability to process graphics data. There is a need to reduce the amount of memory needed to store graphics data and to improve the ability to quickly transfer graphics data between memory and the processor. This problem can be understood by reviewing the way that graphics systems process data.

Computer systems are often used to generate and display graphics on a display. Display images are made up of thousands of tiny dots, where each dot is one of thousands or millions of colors. These dots are known as picture elements, or "pixels". Each pixel has a color, with the color of each pixel being represented by a number value stored in the computer system.

A three dimensional display image, although displayed using a two dimensional array of pixels, may in fact be created by rendering a plurality of graphical objects. Examples of graphical objects include points, lines, polygons, and three dimensional solid objects. Points, lines, and polygons represent rendering "primitives" which are the basis for most rendering instructions. More complex structures, such as three dimensional objects, are formed from a combination or mesh of such primitives. To display a particular scene, the visible primitives associated with the scene are drawn individually by determining those pixels that fall within the edges of the primitive, and obtaining the attributes of the primitive that correspond to each of those pixels. The obtained attributes are used to determine the displayed color values of applicable pixels.

Sometimes, a three dimensional display image is formed from overlapping primitives or surfaces. A blending function based on an opacity value associated with each pixel of each primitive is used to blend the colors of overlapping surfaces or layers when the top surface is not completely opaque. The final displayed color of an individual pixel may thus be a blend of colors from multiple surfaces or layers.

Aliasing

A phenomenon termed, "aliasing" frequently occurs at the border between two overlapping primitives or surfaces. In aliasing, straight lines are displayed such that a stair step effect develops. Pixels are not mathematical points which are either on or off a line. Instead, pixels have a finite width, and, typically, a pixel is considered on a line if the line passes through the pixel's area.

FIG. 1 illustrates an example of aliasing. Edge 1 of a polygon (800) passes through pixels 5, (825), 6 (830), 7 (835), 8 (840), and 9 (845). Thus, polygon 800 covers pixels 5, 6, 7, 8, and 9. These pixels are shaded and pixels 1 (805), 2 (810), 3 (815), and 4 (820) are not shaded. The resulting display looks like a jagged stair step rather than a line.

Anti-Aliasing

Techniques for removing or reducing artifacts by smoothing the appearance of the displayed image and/or increasing the spatial frequency characteristics of the display are known as "anti-aliasing" techniques. One anti-aliasing technique adjusts pixel colors where aliasing occurs in an attempt to smooth the display. For example, a pixel's intensity may depend on the length of the line segment that falls in the pixel's area.

FIG. 2A illustrates an example of anti-aliasing. Edge 1 (900) of a polygon passes through pixels 5, (925), 6 (930), 7 (935), 8 (940), and 9 (945). However, the edge passes through a small portion of pixel 5, so the intensity of the pixel is low. The intensity of pixel 8 is higher because more of the edge passes through pixel 8. Pixel 9 is completely within the polygon, thus it has the darkest shade. Likewise, the intensities of pixels 6 and 7 are also higher. Pixels 1 (905), 2 (910), 3 (915), and 4 (920) are not shaded because the edge does not pass through them. These pixels lie outside of polygon 900. With the intensity adjusted per the amount of pixel lying within the polygon, the resulting edge on the display is smoother than the aliased edge.

Super-sampling is an anti-aliasing technique that increases the spatial quantization of the display's array by increasing the number of data samples that are taken at or around each pixel location corresponding to a portion of the image to be displayed, and then combining the resulting values of these multiple data samples to obtain a final display value for each pixel location. In prior art systems, each super-sample typically includes both a color-value (for either color or gray-scale systems) and a Z-value (a representation of the depth of a pixel which is used to perform hidden surface removal) relating to a reference point (one reference point per super-sample) within that pixel.

Another well-known anti-aliasing technique for determining the color of a pixel is multi-sampling. Unlike super-sampling, multi-sampling uses the color values from the original sample for all sub-samples, and relies on the sub-samples positions to achieve its effect. The number of samples per pixel may vary from application to application. Each pixel is divided into sub-pixels, or samples. A color is determined for each sample, and the sample colors are combined to yield one color for the entire pixel. For example, suppose that each pixel in FIG. 2A is further divided into four samples. Then each sample would cover ¼ of the area of the original pixel, as shown in FIG. 2B. Thus pixel 6 (930) would be of a darker color because two of its samples are covered by the intersecting edge. In contrast, pixel 5 (925) would be of a light color because only one of its samples is covered by the intersecting edge. Thus in simplified terms, pixel 6 (930) may have 50% color contribution from the dark color from polygon 900 and 50% color contribution from the clear background. Thus its final color would be of a 50% shading. Pixel 5 (925) may have 25% color contribution from the dark color from polygon 900 and 75% color contribution from the clear background. Thus its final color would be of a 25% shading.

It must be noted that this is an illustration only and in practice, the number of samples do vary and the granularity depicted in the figures are not to proportion to the actual thickness of the lines and pixels. Also, it can be seen that the more samples a system employs, the better the anti-aliasing can become. However, the demand on system resources increases in proportion to the number of samples.

Rendering

In some cases, graphical data is rendered by executing instructions from an application that is drawing data to a display. During image rendering, three dimensional data is processed into a two dimensional image suitable for display. The three dimensional image data represents attributes such as color, opacity, texture, depth, and perspective information. The draw commands from a program drawing to the display may include, for example, X and Y coordinates for the vertices of the primitive, as well as some attribute parameters for the primitive, and a drawing command. Examples of attribute parameters for primitives include color and depth, or Z data. Three-dimensional data includes not only horizontal and vertical components on an X and Y axis, but also include a depth component along an axis labeled Z. The execution of drawing commands to generate a display image is known as graphics processing.

Three-dimensional data processing is very data intensive. The color data for a pixel is typically 24 or 32 bits. For a megapixel display, large amounts of storage are required just to store the data to be displayed. Compression schemes are needed to reduce the amount of data transferred between the memory and the processor to improve performance. Conventional graphics processors and their associated graphics processing units (GPUs) use these compression schemes to reduce the bandwidth needed to access the color data or other types of data stored in the frame buffer memory.

These compression schemes usually operate on tiles that include color data or other types of data typically stored in a framebuffer, e.g., depth data, stencil data, etc., for several pixels. Reduction compression can reduce several pixels in a tile or several sub-pixel samples in a pixel down to one color value for a pixel and is possible when the samples all share similar values in their red, green, blue, alpha, etc. components (or channels). Conventional systems that employ multi-sampling anti-aliasing techniques are generally suited to use reduction compression because the "reduction ratio" (number of samples in a group to be reduced to one color value) used by such systems can be identical to the number of samples in a pixel. For example, in the example illustrated in FIG. 2B, the reduction ratio that would be used in conventional systems would be 4:1, which is commensurate with the 4 sub-pixel samples used per pixel. However, because they tie the number of samples in a group being reduced to the reduction ratio, conventional systems may be limited in the advantages they offer.

Also, conventional compression schemes are designed to minimize visual artifacts in an image. When the color data for multiple sub-pixel samples within a pixel or multiple pixels within a tile are compressed, visual artifacts may be introduced. For example, assume a tile includes a blue background and a red primitive that partially covers the tile. The color data for the tile is compressed by combining the color data to produce a purple color for the pixels along the edge where the red primitive overlaps the blue background and the compressed color data is written to memory. Visual artifacts are introduced when a second red primitive is received that covers the remaining portion of the tile. The compressed color data is read from memory and combined with the second red primitive to produce compressed color data that is reddish-purple along the edge. The final compressed color along the edge should be red, but instead the final compressed color along the edge is reddish-purple. None of the purple background color should be included in the final compressed color. The visual artifacts may appear as cracks at primitive edges in meshes. Conventional systems were unable to compress color data or other types of data, e.g., depth and stencil data for a tile without introducing visual artifacts.

BRIEF SUMMARY OF THE INVENTION

Accordingly, a need exists for a framebuffer compression scheme that can address the problems with the systems described above. What is needed is a more intelligent framebuffer compression scheme that takes advantage of any improvement in throughput or computational performance that may result from using a reduction ratio that is not tied to the number of samples being used as part of the anti-aliasing mode e.g. multi-sampling mode. Further, for compression schemes performing lossy compression, what is needed is a more robust mechanism to perform threshold comparisons that maximizes compression and reduces any loss from compression to the lowest maximum error for any sample (or pixel) in the group.

To address the issue of visual artifacts, in one embodiment, the present invention employs a method for compressing color data, or other types of data, e.g., depth and stencil data typically stored in the framebuffer, for a tile including multiple samples using an equality comparison and a threshold comparison to produce the compressed color data for the tile. The equality comparison is typically performed on a first portion of the framebuffer data that can include at least exponent and sign fields of floating point format values or high order bits of integer format values. The threshold comparison is typically performed on a second portion of the framebuffer data that can include mantissa fields of floating point format values or low order bits of integer format values. The equality comparison and threshold comparison are used to compress the framebuffer data or output the original framebuffer data of each sample as the output framebuffer data for the respective samples of the tile. Further, a threshold value used for the threshold comparison can be set to zero to enable lossless compression of the data.

In one embodiment, a method for compressing framebuffer data is presented. The method comprises determining a reduction ratio for framebuffer data in a tile including multiple samples. The method further comprises comparing a first portion of the framebuffer data for each of the multiple samples to determine an equality comparison result and also comparing a second portion of the framebuffer data for each one of the multiple samples to compute per-channel differences for each one of the multiple samples and testing the per-channel differences against a threshold value to determine a threshold comparison result. The method also comprises compressing the framebuffer data for the tile based on the reduction ratio, the equality comparison result and the threshold comparison result to produce output framebuffer data for the tile.

In one embodiment, the reduction ratio is independent of a sampling mode, wherein the sampling mode is the number of samples within each pixel in the tile. In a different embodiment, the reduction ratio can be greater than the sampling mode. In this embodiment, the step of compressing may further comprise using framebuffer data from neighboring pixels to produce output framebuffer data for each pixel in the tile. In one embodiment, each pixel within the tile contains only one sample. In another embodiment, the reduction ratio is selectable by software at system start-up, while in a different embodiment the reduction ratio is determined on the fly based on computational and compression performance factors.

In one embodiment, the present invention is directed towards a computer readable storage medium storing instructions that, when executed by a processor, cause the processor to compress framebuffer data. The instructions, when executed by the processor, perform the steps of (a) determining a reduction ratio for framebuffer data in a tile including multiple samples, and receiving the framebuffer data for the tile, (b) comparing a first portion of the framebuffer data for each of the multiple samples to determine an equality comparison result, (c) comparing a second portion of the framebuffer data for each one of the multiple samples to compute per-channel differences for each one of the multiple samples and testing the per-channel differences against a threshold value to determine a threshold comparison result, and (d) compressing the framebuffer data for the tile based on the reduction ratio, the equality comparison result and the threshold comparison result to produce output framebuffer data for the tile.

In one embodiment, the present invention is implemented as a system for compressing framebuffer data. The system includes a processor configured to determine a reduction ratio for framebuffer data in a tile including multiple samples. The processor further comprises a compression module configured to receive the framebuffer data for the tile and compare a first portion of the framebuffer data for each of the multiple samples to determine an equality comparison result. The compression module is further configured to compare a second portion of the framebuffer data for each one of the multiple samples to compute per-channel differences for each one of the multiple samples and testing the per-channel differences against a threshold value to determine a threshold comparison result. Finally, the compression module is configured to compress the framebuffer data for the tile based on the reduction ratio, the equality comparison result and the threshold comparison result to produce output framebuffer data for the tile.

The following detailed description together with the accompanying drawings will provide a better understanding of the nature and advantages of the present invention.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
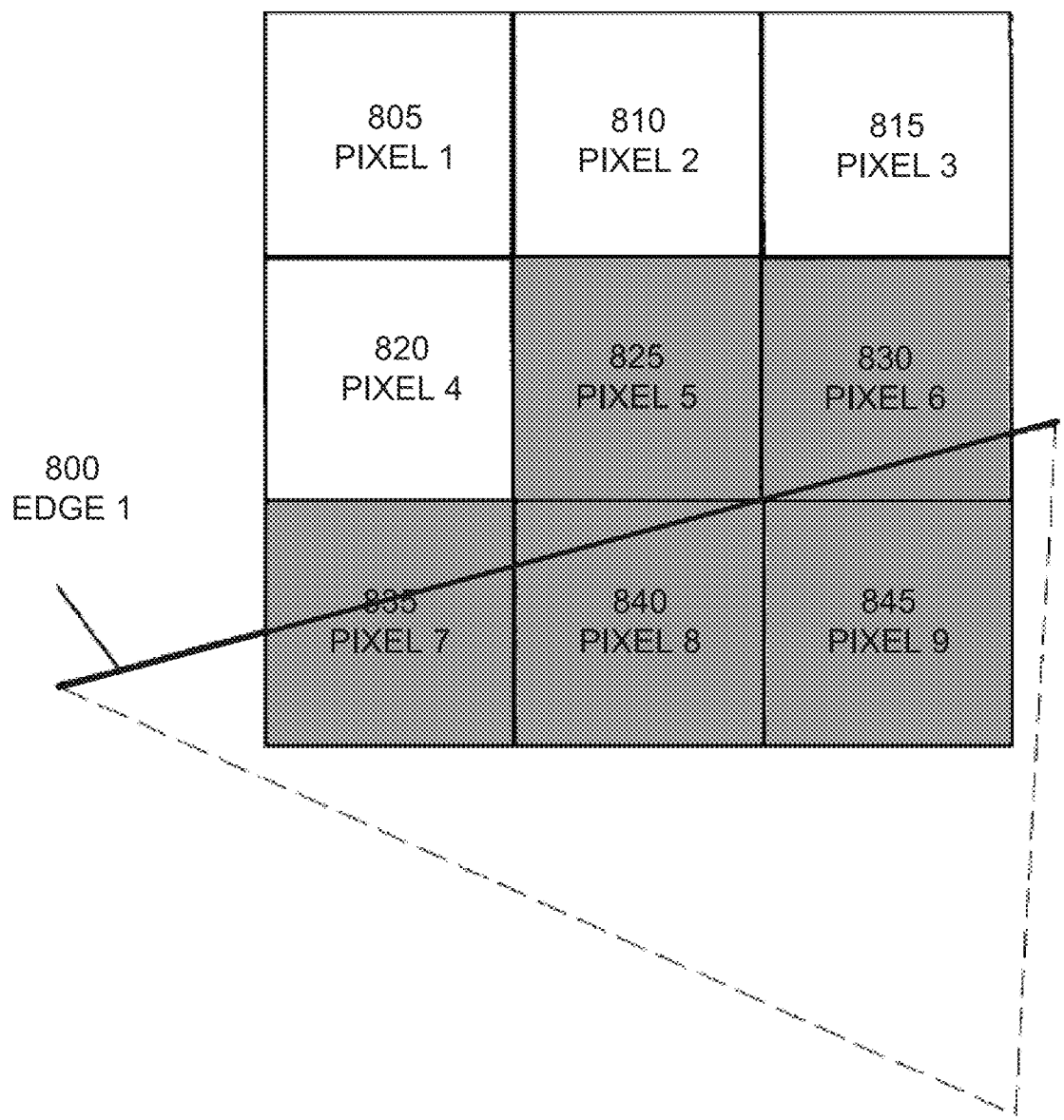
FIG. 1 is a diagram of an example of aliasing.

In the figures, elements having the same designation have the same or similar function.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "allocating," "associating," "moving," "setting," "accessing," "controlling," "adding," "recording," "determining," "identifying," "caching," "maintaining," "incrementing," "comparing," "removing," "reading," "writing," or the like, refer to actions and processes (e.g., the flowchart of FIG. 7B) of a computer system or similar electronic computing device or processor (e.g., system 100 of FIG. 3). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Figure 3:
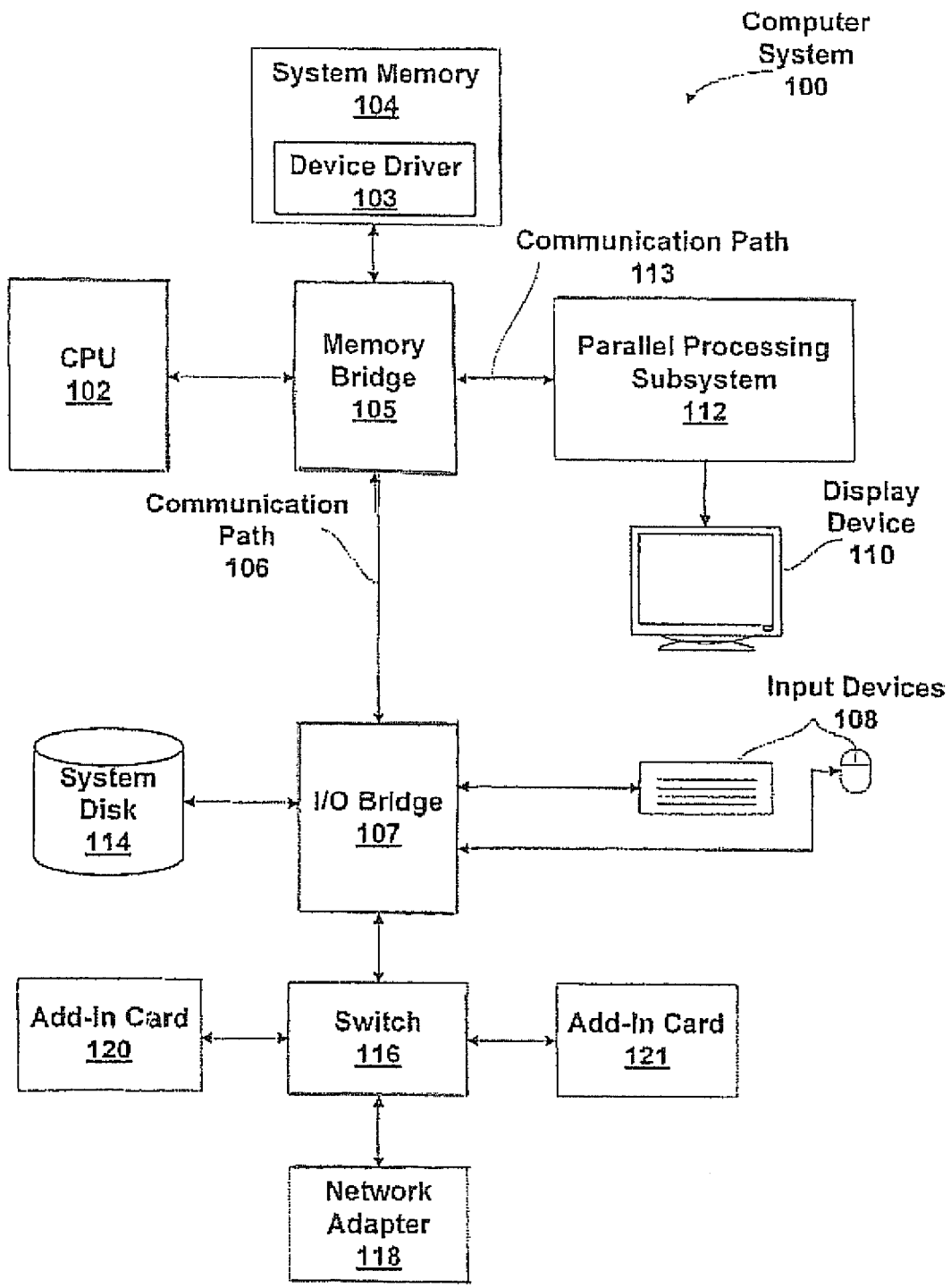
FIG. 3 is a block diagram illustrating a computer system configured to implement one or more aspects of the present invention.

FIG. 3 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105.

A parallel processing subsystem 112 is coupled to memory bridge 105 via a bus or other communication path 113 (e.g., a PCI Express, Accelerated Graphics Port, or HyperTransport link). In one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107.

Communication paths interconnecting the various components in FIG. 3 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 4:
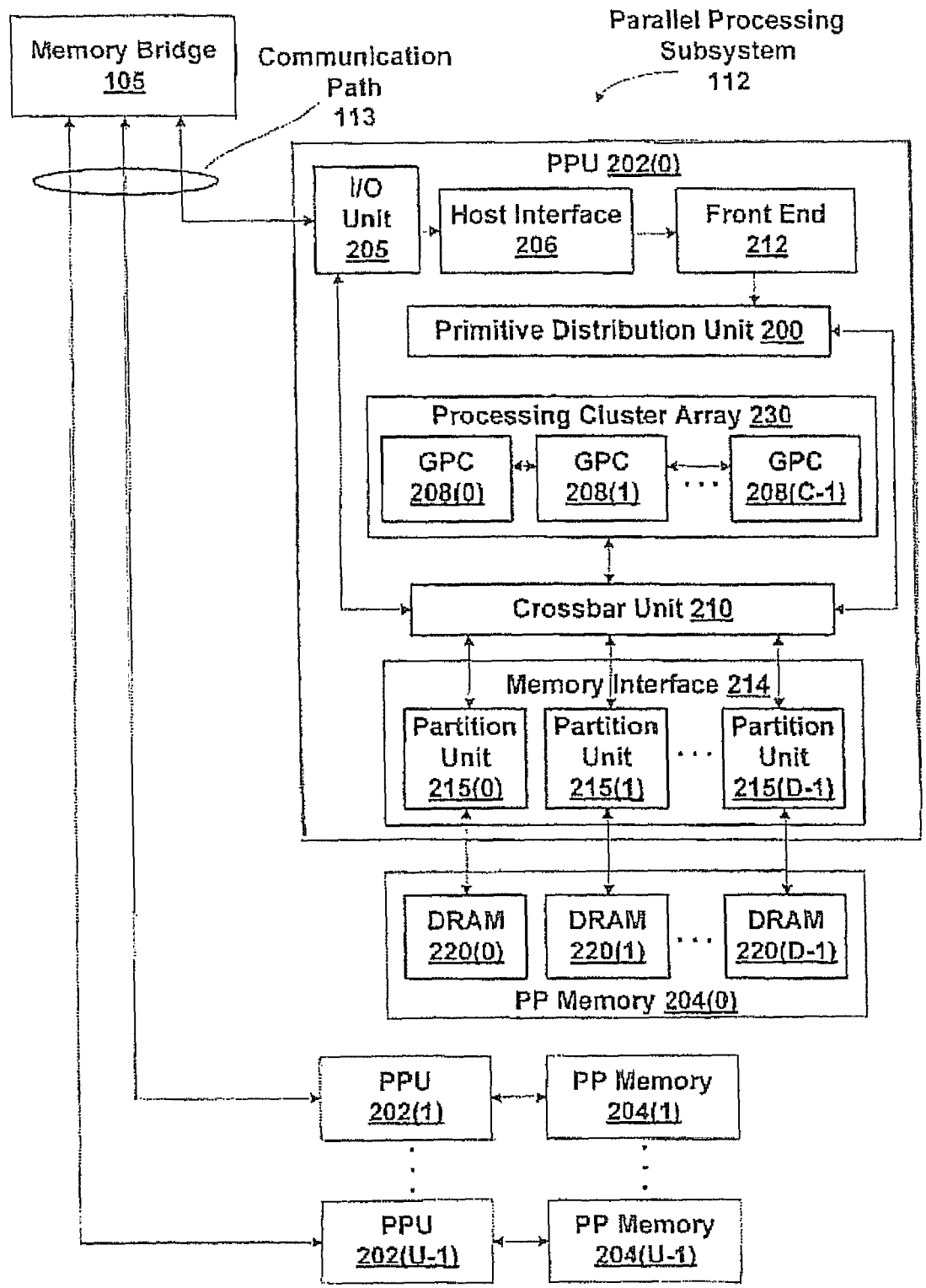
FIG. 4 is a block diagram of an exemplary parallel processing subsystem for the computer system of FIG. 1, according to one embodiment of the present invention.

FIG. 4 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U~1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 3, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 3 or FIG. 4) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 4, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C is greater than or equal to 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a primitive distribution unit 200, which receives commands defining processing tasks from front end unit 212. Processing tasks include indices of data to be processed, e.g., surface (patch) data, primitive data, as well as state parameters and commands defining how the data is to be processed (e.g., what program is to be executed). Primitive distribution unit 200 may be configured to fetch the indices corresponding to the data, or primitive distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A primitive distribution unit 200 may be configured to produce tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen-space to produce a rendered image. Intermediate data produced by GPCs 208, such vertex attributes, may be stored in buffers to allow the intermediate data to be transmitted between GPCs 208 for further processing.

Memory interface 214 includes a number 0 of partition units 215 that are each directly coupled to a portion of parallel processing memory 204, where D is greater than or equal to 1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 4, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 5A:
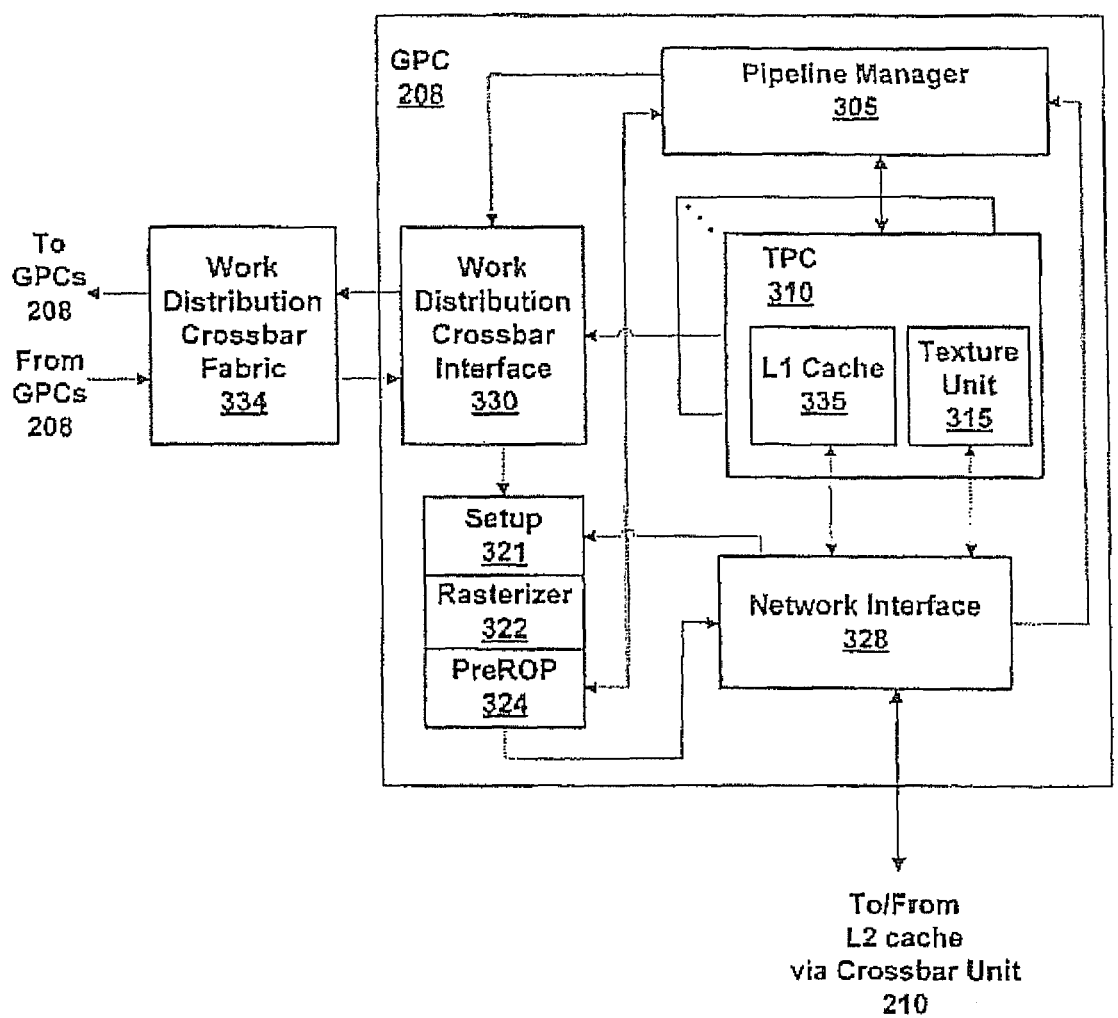
FIG. 5A is a block diagram of a GPC within one of the PPUs of FIG. 4, according to one embodiment of the present invention.

FIG. 5A is a block diagram of a GPC 208 within one of the PPUs 202 of FIG. 4, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

The primitive distribution unit 200 distributes processing tasks to each thread processing cluster (TPC) 310 within the GPCs 208 via crossbar unit 210. In particular the primitive distribution unit 200 distributes primitives for object-space (geometry) processing by the TPCs 310. A pipeline manager 305 within each GPC 208 distributes the object-space processing tasks to streaming multiprocessors within each of the TPCs 310. Pipeline manager 305 may also be configured to control a work distribution crossbar interface 330 to distribute state parameters and commands to the TPCs 310 for object-space processing and screen-space processing.

In one embodiment, each GPC 208 includes a number M of TPCs 310, where M is greater than or equal to 1, each TPC 310 configured to process one or more thread groups. Also, each TPC 310 advantageously includes an identical set of functional execution units (e.g., arithmetic logic units, and load-store units, and the like) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an TPC 310 is referred to herein as a "warp" or "thread group." As used herein, a "thread group" refers to a group of threads concurrently executing the same program on different input data, with one thread of the group being assigned to a different processing engine within a TPC 310. A thread group may include fewer threads than the number of processing engines within the TPC 310, in which case some processing engines will be idle during cycles when that thread group is being processed. A thread group may also include more threads than the number of processing engines within the TPC 310, in which case processing will take place over multiple clock cycles. Since each TPC 310 can support up to G thread groups concurrently, it follows that up to G*M thread groups can be executing in GPC 208 at any given time.

Additionally, a plurality of related thread groups may be active (in different phases of execution) at the same time within a TPC 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the TPC 310, and m is the number of thread groups simultaneously active within the TPC 310. The size of a CTA is generally determined by the programmer and the amount of hardware resources, such as memory or registers, available to the CTA.

Each TPC 310 contains an L1 cache 335 or uses space in a corresponding L1 cache outside of the TPC 310 that is used to perform load and store operations. Each TPC 310 also has access to L2 caches within the partition units 215 that are shared among all GPCs 208 and may be used to transfer data produced during object-space primitive processing to TPCs 310 to perform screen-space primitive processing. Finally, TPCs 310 also have access to off-chip "global" memory, which can include, e.g., parallel processing memory 204 and/or system memory 104. It is to be understood that any memory external to PPU 202 may be used as global memory. Additionally, an L1.5 cache may be included within the GPC 208, configured to receive and hold data fetched from memory via memory interface 214 requested by TPC 310, including instructions, uniform data, and constant data, and provide the requested data to TPC 310. Embodiments having multiple TPCs 310 in GPC 208 beneficially share common instructions and data cached in an L1.5 cache.

Each GPC 208 includes a network interface 328 that may be configured to map virtual addresses into physical addresses. In other embodiments, the mapping of virtual addresses into physical addresses may be performed within the memory interface 214. A set of page table entries (PTEs) is used to map a virtual address to a physical address of a tile and optionally a cache line index. Address translation lookaside buffers (TLB) or caches may reside within a TPC 310 or the L1 cache 335 or GPC 208. The physical address is processed to distribute render target data access locality to allow efficient request interleaving among partition units. The cache line index may be used to determine whether or not a request for a cache line is a hit or miss.

A GPC 208 may be configured such that each TPC 310 includes a texture unit 315 for performing texture mapping operations, e.g., determining texture sample positions, reading texture data, and filtering the texture data. Texture data is read from a texture L1 cache or in some embodiments from the L1 cache 335 within TPC 310 and is fetched from an L2 cache, parallel processing memory 204, or system memory 104, as needed.

As previously explained, TPCs 310 receive batches of primitives and perform object-space processing. Each TPC 310 outputs a stream of object space processed primitive descriptors to the work distribution crossbar interface 330 in order to redistribute the object-space processed primitive descriptors via the work distribution crossbar fabric 334 to one or more GPCs 208 for screen-space processing. A primitive descriptor includes the primitive type (triangle strip, triangle mesh, line, and the like), flags, and indices of vertices. The object-space processing includes one or more of vertex shading, tessellation shading, and geometry shading. The screen-space processing is rasterization of the primitives, and may include one or more of scan conversion, shading, depth/stencil operations, and blending. TPC 310 may also output the object-space processed primitive data, i.e., vertex attributes, for storage in an L2 cache, parallel processing memory 204, or system memory 104 via crossbar unit 210.

A preROP (pre-raster operations) 324 is configured to receive data (screen-space processed primitives) from TPC 310, direct data to ROP units within partition units 215, and perform optimizations for color blending, organize pixel color data, and perform address translations. It will be appreciated that the core architecture described herein is illustrative and that variations and modifications are possible. Any number of processing units, e.g., TPCs 310, setup units 321, rasterizers 322, or preROPs 324 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 5B:
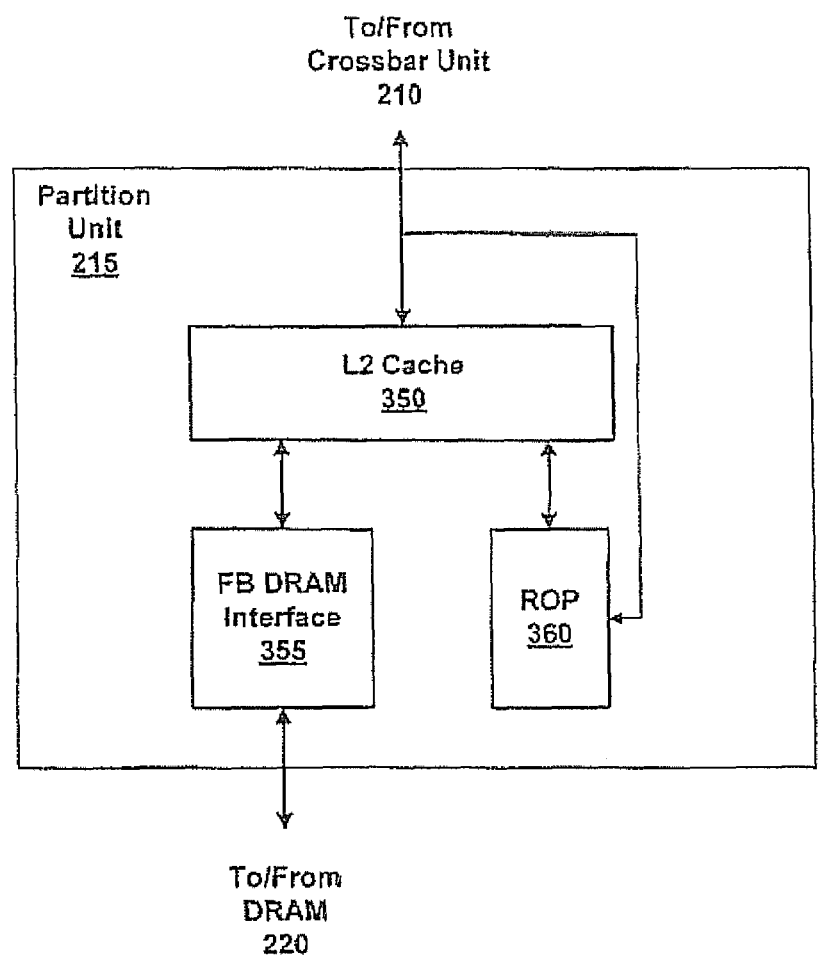
FIG. 5B is a block diagram of a partition unit within one of the PPUs of FIG. 4, according to one embodiment of the present invention.

FIG. 5B is a block diagram of a partition unit 215 within one of the PPUs 202 of FIG. 4, according to one embodiment of the present invention. As shown, partition unit 215 includes a L2 cache 350, a frame buffer (FB) DRAM interface 355, and a raster operations unit (ROP) 360. Each partition unit 215 includes a ROP 360 in order to distribute processing of the raster operations. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. ROP 360 receives color and z fragment data from the GPCs 208 and may be configured to compress z or color data that is written to memory and decompress z or color data that is read from memory. In some embodiments of the present invention, ROP 360 is included within each GPC 208 instead of partition unit 215, and pixel read and write requests are transmitted over crossbar unit 210 instead of pixel fragment data.

Persons skilled in the art will understand that the architecture described in FIGS. 3, 4, 5A and 5B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 6:
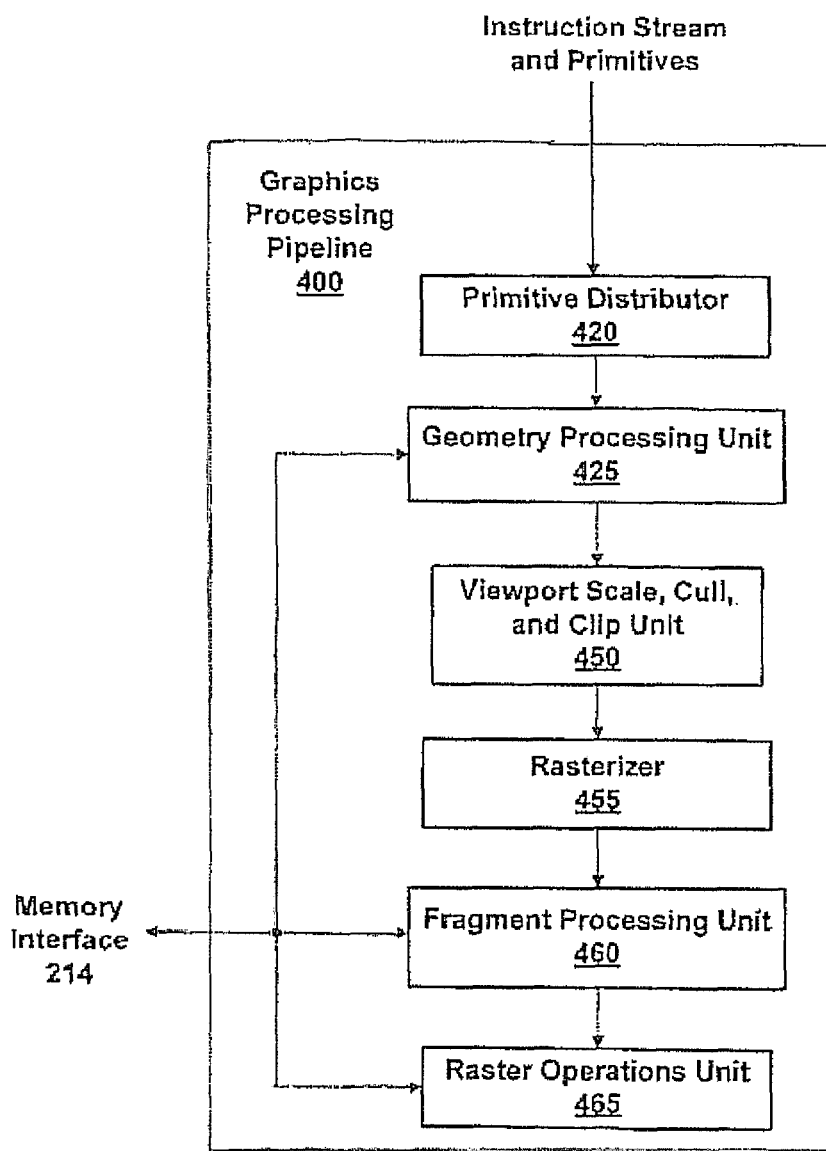
FIG. 6 is a conceptual diagram of an exemplary graphics processing pipeline that one or more of the PPUs of FIG. 4 can be configured to implement, according to one embodiment of the present invention.

FIG. 6 is a conceptual diagram of a graphics processing pipeline 400, that one or more of the PPUs 202 of FIG. 4 can be configured to implement, according to one embodiment of the present invention. For example, one of the TPCs 310 may be configured to perform the functions of one or more of a geometry processing unit 425, and a fragment processing unit 460. The functions of primitive distributer 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Vertex data for high-order surfaces, primitives, and the like may be stored in L1 cache 335, parallel processing memory 204, or system memory 104 and accessed as needed to render the primitives. The functions of the primitive distributer 420 may be performed by the primitive distribution unit 200.

Primitive distributer 420 receives pointers to primitive index lists stored in memory. The entries in these index lists point into lists of vertex attributes (vertex buffers), also stored in memory. Because primitives are stored compactly and many primitives can be passed to the primitive distributer 420 in a single draw call, indexed primitive lists and vertex buffers are the most efficient way to convey geometry to the graphics pipeline 400. The front end 212 may be configured to store legacy inline and immediate mode vertices in vertex buffers, so the primitive assembler 420 only has to deal with this one, efficient type of primitive input data, namely primitive index lists. In other embodiments the primitive distributer 420 may receive the vertex data instead of pointers to primitive index lists.

In some embodiments, the GPCs 208 are configured to perform tessellation processing prior to geometry processing. In those embodiments the primitive distributer 420 distributes batches of primitives for tessellation processing to multiple TPCs 310 and streams of tessellated primitive batches are produced.

Primitive distributer 420 dices the index list into self-contained batches of indices specifying up to J vertices and K primitives, such that each vertex in a strip, after the first two, specifies a new triangle. In some embodiments, J is 32, K is 30, and batches may occupy from one to four 32B data packets, depending on the number and type of primitive and contain the following information: indices of vertices in the vertex buffer and topology information (which vertices in the batch comprise each primitive). Importantly, the primitive distributer 420 works entirely with primitive indices—it does not touch the vertex data itself. The vertex data is later fetched by the TPC 310 assigned for vertex shading.

Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory.

The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Alternate Reduction Ratios and Threshold Mechanisms for Framebuffer Compression

Embodiments of the present invention provide methods and systems for a more intelligent framebuffer compression scheme that determines and uses a reduction ratio to perform compression that is not tied to the number of samples used in the anti-aliasing mode being employed, thereby, resulting in an improvement in throughput or computational performance or both. Embodiments of the present invention also provide methods and systems to employ a more robust mechanism for performing threshold comparisons in compression schemes employing lossy compression, thereby, minimizing errors. In one embodiment, the framebuffer data is color data. In another embodiment the framebuffer data can be depth data or stencil data. While the present invention is discussed mainly in reference to color compression, it should be noted that the compression techniques of the present invention can also be applied to other types of data stored in the framebuffer, e.g., depth data, stencil data, etc.

Figure 7A:
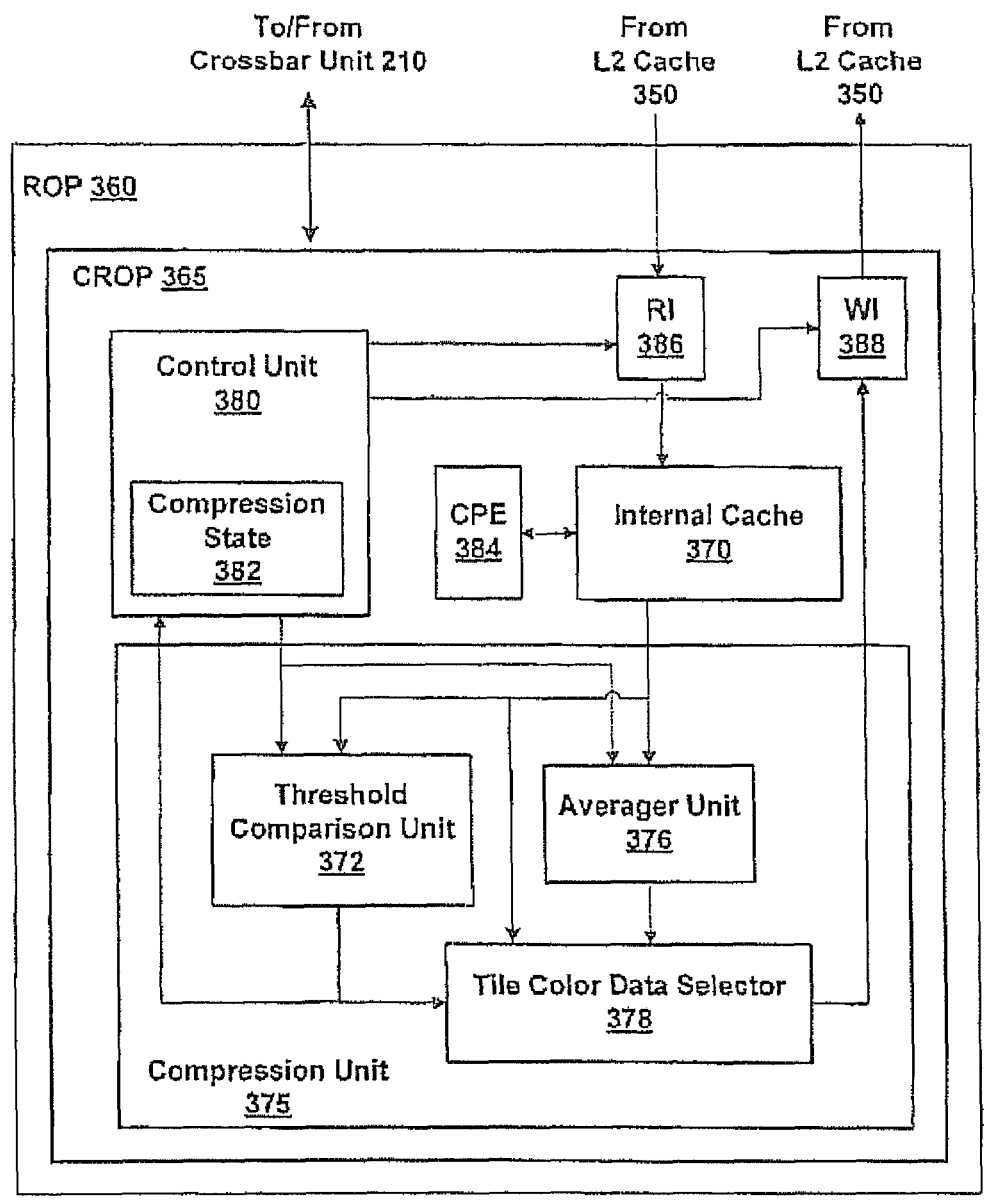
FIG. 7A is a block diagram of a portion of the raster operations unit of FIG. 5B, according to one embodiment of the present invention.

FIG. 7A is a block diagram of a portion of the ROP 360 of FIG. 5B, according to one embodiment of the present invention. The ROP 360 includes a color raster operations unit (CROP) 365, and the CROP 365 includes a control unit 380, internal cache 370, and a compression unit 375. In operation, the CROP 365 performs color raster operations, including compression of color data written to and decompression of color data read from L2 cache 350 via RI 386. The CROP 365 may also include a read interface (RI) 386, a color processing engine (CPE) 384, a write interface (WI) 388, and the like.

When performing color raster operations, the CROP may perform single source blending or dual source blending. The source data is received by CROP 365 from the GPCs 208. In aliased or multi-sample anti-aliased (MSAA) sampling modes, the source data is pixel data since in aliased and MSAA sampling modes, there is only one color value per pixel. In supersampling anti-aliased (SSAA) sampling mode, the source data is per sample.

For single source blending, control unit 380 first determines whether additional data (referred to herein as "destination data") is needed to perform the color raster operation on the source data stored in the internal cache 370. The destination data values may be per pixel or per sample.

If the destination data is not needed, then control unit 380 determines whether the tile is partially or fully covered by the source data. If the tile is partially covered, the source data cannot be compressed by the compression unit 375. If the source data does fully cover the tile, then the compression unit can compress the source data. In some embodiments source data may be coalesced in the internal cache 370 so that source data for two or more primitives that each partially cover the tile are aggregated to produce source data that fully covers the tile.

When a MSAA sampling mode with many samples is used to produce the source data, the source data is, by definition, reduced since a single color value is used for multiple samples. When a MSAA sampling mode with few samples or a SSAA sampling mode is used to produce the source data, compressing the source data may significantly reduce the size of the source data.

If the destination data is needed and is available in the internal cache 370, then the source data and the destination data is transmitted to CPE 384 to blend the destination data and the source data and produce color data. The color data is then stored in the internal cache 370. Fully covered tiles are output to the compression unit 375 for lossy or lossless reduction compression. The compression unit 375 optionally compresses the color data based on the compression state and transmits the compressed color data to the L2 cache unit 350 via the WI 388 for storage. In some embodiments the compressed color data may be further compressed within the CROP 365 or the L2 cache unit 350 using other techniques.

If the destination data is needed and not available in the internal cache 375, then the control unit 380 first transmits a read request to the L2 cache unit 350 requesting the destination data. The source data is buffered until the destination data is retrieved from the L2 cache unit 350. The L2 cache unit 350 returns the requested destination data to a decompression unit (not shown) that optionally decompresses the requested destination data based on the compression state 382. The color data is then stored in the internal cache 370.

The destination data and the source data are then blended to produce the color data for a tile. Fully covered tiles are output to the compression unit 375 which optionally compresses the color data based on the compression state and transmits the compressed color data to the L2 cache unit 350 for storage. In one embodiment, the data may have been left in the compressed state before blending, so the input to the compression unit 375 may already be compressed.

The compression state 382 is stored in the control unit 380 and includes information specifying the compression format of different render targets stored in graphics memory. The compression state 382 also stores information specifying the color depth, color format, and pixel sample mode for each render target.

Examples of some possible color values include 8, 16, 24, 32, 64, 128 bits per sample of a pixel, each sample may contain up to four channels. The channels may represent red, green, blue, alpha, luminance, chrominance, saturation, and the like. The different channels may be represented in different formats, such as signed or unsigned integer or floating point values. Finally, different sampling modes specify one or more sub-pixel samples per pixel and positions of the sub-pixel samples within the pixel as well as the number of color values that are shared between two or more samples.

As indicated above, the compression techniques of the present invention can also be applied to other types of data stored in the framebuffer, e.g., depth data, stencil data, etc. Examples of some possible depth ("Z" or "z") values include 16, 24, or 32 bits per sample of a pixel, each sample contains a single depth value and may be represented in different formats, such as signed or unsigned integer or floating point values. Finally, different sampling modes specify one or more sub-pixel samples per pixel and positions of the sub-pixel samples within the pixel as well as the number of depth values that are shared between two or more samples. Example of some possible stencil values include 4 or 8 bits per sample of a pixel, each sample contains a single stencil value and is usually used in numerical comparison to a reference value after a bit-wise mask is applied.

In conventional systems, the reduction ratio (or compression ratio) is programmed to be equivalent to the sampling mode. For example, using the example from FIG. 2B, if the multisampling mode uses four samples per pixel, conventional systems would simply perform a 4:1 reduction, i.e., the four sub-pixel samples taken per pixel would be reduced to one to produce one color value for the pixel.

Figure 2A:
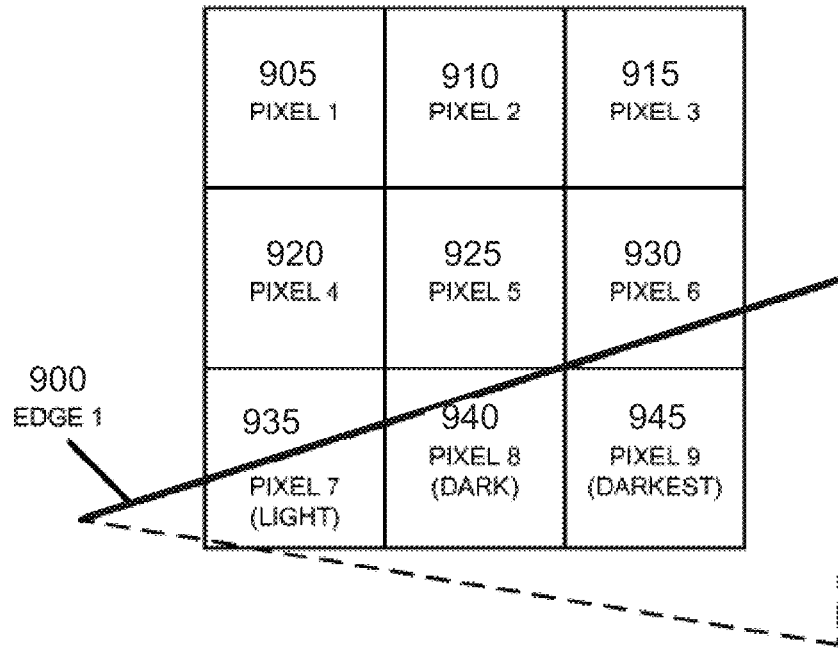
FIG. 2A is a diagram of an example of anti-aliasing.
Figure 2B:
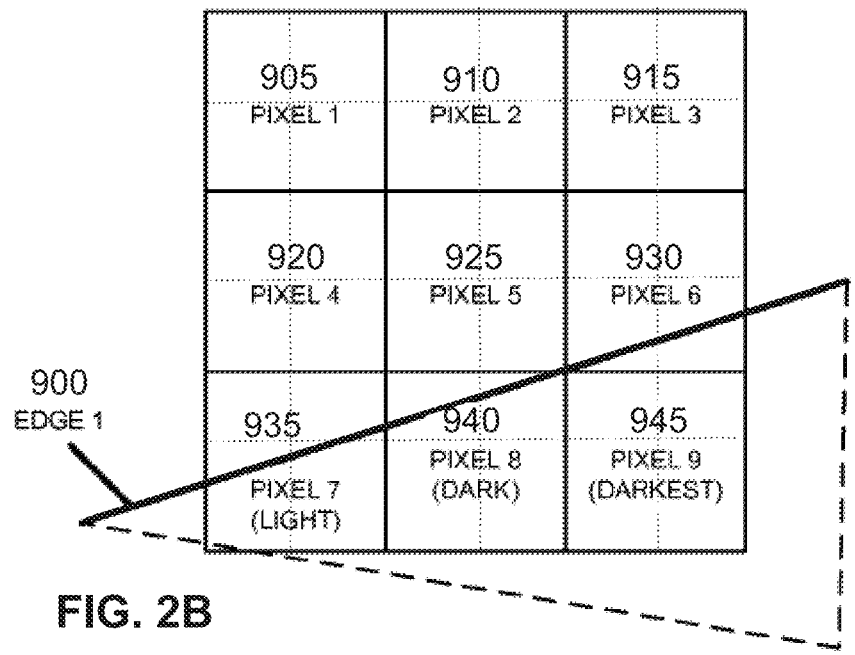
FIG. 2B is a diagram of an example of anti-aliasing with multi-sampling.

In one embodiment of the present invention, the reduction ratio used to compress a particular tile is not dependent on the sampling mode. In the example of FIG. 2B for instance, it may be the case that using a 2:1 reduction would result in better throughput. Or it may be that using a 2:1 reduction scheme allows a significant improvement in processing performance and is more desirable in comparison to any throughput gains achieved from using the 4:1 reduction ratio. In the example of FIG. 2B, if a 2:1 reduction ratio is used, then half the sub-pixel samples (i.e., 2 of the 4 pixels) will have a different final combined color value than the remainder of the pixels.

In one embodiment, the control until 380 will have built-in logic to decide if using a reduction scheme that is not tied to the sampling mode would be more beneficial. A status bit in the compression state can be set if a reduction ratio that is not tied to the sampling mode is used. Also, the reduction ratio used to perform the compression can be stored either in extra dedicated bits within the compression state or within the compression data itself. This information is needed by the decompression unit to accurately decompress the data. In another embodiment, the reduction ratio is selectable by software at system startup. In this embodiment, the compression state does not need to have any extra bits to store the reduction ratio values.

While reduction naturally applies to multisampled surfaces, one embodiment of the present invention can also apply this intelligent reduction scheme to aliased surfaces. Aliased surfaces are ones where the sampling mode for the particular surface specifies only one sub-pixel sample per pixel. In one embodiment, lossless reduction compression on aliased buffers can also use a variable reduction ratio. For example, reduction compression ratios of 2:1, 4:1 and 8:1 can be used on aliased buffers. This can improve compression ratios in regions of an image with little color variation, such as sky, fog, blank walls and forth. In one embodiment, when only one sub-pixel sample per pixel is specified in the sampling mode (i.e., for an aliased surface), the compression scheme uses either adjacent or neighboring pixels to determine the averaged color value for a given pixel.

As explained above, the intelligent reduction compression with variable reduction ratios can be applied to both aliased and anti-aliased buffers, so that the number of samples per pixel need not match the compression ratio. Although matching can be a useful simplification, higher compression results may be achievable by supporting reduction ratios that are higher than the multisampling factor. Similarly compression or computational improvements may be achievable by supporting lower compression ratios. The present invention is advantageous because it can intelligently use a compression ratio that is best suited to the image being compressed. For example, for an image of a blank wall, a compression scheme using only one sample per pixel may use neighboring pixels to perform an 8:1 reduction, which will significantly reduce the size of the source color data without sacrificing too much in quality.

The compression unit 375 is configured to compress color data for a tile in order to reduce the amount of color data that is stored in graphics memory and transmitted between the graphics memory and a PPU 202. The averager unit 376 computes averaged color data as a per-color channel linear average of all the subpixel samples in each pixel of the tile.

For example, when the sampling mode specifies only one sub-pixel sample per pixel, channels of pixel pairs (for a 2:1 reduction ratio), pixel quads (for a 4:1 reduction ratio) or dual-quads (for an 8:1 reduction ratio) may be averaged to compute per-color channel averages for the pixels in the pair, quad or dual-quad respectively. In some embodiments the pixel pairs, quads or dual-quads are horizontally or vertically adjacent pixels and in other embodiments they are neighboring pixels.

In other embodiments, color channels of clusters of multiple samples (or pixels) may be averaged to compute per-color channel combined values for these clusters of samples (or pixels). In yet other embodiments, the color component values may be combined by a means other than simple averaging, for example, non-linear combinations that implement gamma-correct antialiasing or other techniques familiar to one skilled in the art, to compute per-color combined channel values. Consequently, the color data may be compressed for each one of the pixel sample modes using a reduction ratio that may or may not be the same as the sampling mode.

The threshold comparison unit 372 determines whether sub-pixel samples of each pixel in a tile are similar enough to each other that the averaged color data may be used as the output color data that is compressed. More specifically, the threshold comparison unit 372 performs an equality comparison on a first portion of the color data that includes sign and exponent fields of floating point format values or high order bits of integer format values. The equality comparison may also include some most-significant bits of the mantissa field of floating point format values. A threshold comparison is performed on a second portion of the color data that includes mantissa fields (or least-significant bits of the mantissa field that were not used for the equality comparison) of floating point format values or low order bits of integer format values. The tile color data selector 378 outputs either the original color data received by the compression unit 375 for each sample or the averaged color data computed by the averager unit 376 as the output color data, based on the equality comparison result and the threshold comparison result produced by the threshold comparison unit 372.

TABLE 1 illustrates examples of different compression ratios that may be achieved when the averaged color data is output as the output color data in accordance with one embodiment of the invention. In other embodiments, reduction ratios beyond 8:1 may also be employed.

| Bits per pixel | Sub-pixel samples per pixel | Possible Compression ratios |
| --- | --- | --- |
| 32 | 1 or 2 | 2:1, 4:1, 8:1, etc. |
| 32 | 4 | 2:1, 4:1, 8:1, etc. |
| 32 | 8 | 2:1, 4:1, 8:1, etc. |
| 64 | 1 or 2 | 2:1, 4:1, 8:1, etc. |
| 64 | 4 | 2:1, 4:1, 8:1, etc. |
| 64 | 8 | 2:1, 4:1, 8:1, etc. |
| 128 | 1 or 2 | 2:1, 4:1, 8:1, etc. |
| 128 | 4 | 2:1, 4:1, 8:1, etc. |
| 128 | 8 | 2:1, 4:1, 8:1, etc. |

The threshold value controls the amount of variation that is tolerated between colors that are compressed. Different threshold values may be specified for each color format and color depth and stored in the compression state 382.

Additionally, two or more threshold values may be specified for each render target. For example, an aggressive threshold value and a conservative threshold value may be specified. In some embodiments, the aggressive threshold may allow for the channel values to vary by the largest amount possible given a particular color data format, e.g., for an 8-bit channel the aggressive threshold is 0xff. The conservative threshold may be set to a low value, such that only samples with very similar colors may be reduced. When the conservative threshold is set to zero, only samples with identical colors can be reduced. Reduction in this case is lossless, since the averaged color data exactly equals the input (source) color data. The intelligent reduction compression scheme of the present invention can be applied to lossless reduction as well as lossy threshold reduction.

Visual artifacts can occur at mesh seams if reduction is allowed between samples of a foreground object and the background as the foreground object is rendered. If the foreground and background have significantly different colors and reduction is performed on pixels straddling a mesh seam, the reduced colors will be a blend of foreground and background. When the primitive from the foreground object on the opposite side of the seam is rendered, portions of the background color will still be visible.

To avoid these artifacts, while maximizing compression, one embodiment uses an "All Covered All Hit Once" heuristic in the threshold comparison unit 372 to choose between the aggressive threshold value and the conservative threshold value. When every sample in the tile is covered by new source fragments AND no sample has been hit by multiple source fragments, the "All Covered All Hit Once" heuristic evaluates to true. This indicates the tile is unlikely to contain a silhouette edge from an unfinished mesh seam and the aggressive threshold value may be used. When the "All Covered All Hit Once" heuristic is false, the tile is likely to contain a silhouette edge from an unfinished mesh seam, thus the conservative threshold value must be used. Other embodiments may use different heuristics, may implement additional threshold values or may determine threshold values using a formula. It will be recognized that any such variations are within the scope of this invention.

The threshold comparison unit 372 receives the post-blend color data for the tile and divides the color data into a first portion and a second portion. The first portion includes fields (equality fields) of each channel of each source subpixel sample that are compared for exact equality to produce an equality comparison result. The second portion includes fields (threshold fields) that are compared to each other and the resulting difference tested against a threshold value. The fields that are used for the equality comparison and the threshold comparison vary based on the color format. For example, the 8 least significant bits (lsbs) of 16 bit floating point data for a channel are included in the threshold field and are input to the threshold comparison. The 8 most significant bits (msbs) are the equality field and are input to the equality comparison. Thus, the sign bit, five exponent bits, and upper two mantissa bits must match exactly, between color data in a sample (or pixel) cluster. The lower 8 mantissa bits must be within the threshold value, between color data in a sample (or pixel) cluster. When floating point format values are compared with the threshold value, relative error may be measured since the threshold value implicitly has the same exponent as the first portion of the color data.

In one embodiment, the threshold-based reduction is performed as follows: First, the minimum value and maximum value of each channel is determined for each sample in a pixel of the tile. When sample clusters are used, the minimum value and maximum value of each channel is determined for each sample in a sample cluster of the tile. Then the difference between minimum value and maximum value is computed for each channel of each pixel or each sample cluster in the tile to produce per-channel differences. Finally, the per-channel differences are compared to the threshold value. If all of the per-channel differences are within the threshold value (less than or equal to the threshold value) for all of the pixels or sample clusters in the tile, then the tile can be compressed. When the tile can be compressed, the average value for each cluster is stored in the tile to represent the color for each sample in the cluster. When one or more pixels or sample clusters cannot be compressed, then the whole tile is not compressed and the color value for each sample is stored in the tile and, accordingly, there is no compression. Note that when a single sample is used for each pixel, each sample cluster may include multiple pixels within the tile.

In one embodiment, instead of using a single minimum and maximum value of each channel for each pixel, a mean average of at least two or more minimums and two or more maximums is used for each channel in a pixel (or cluster) to determine the per-channel differences. This avoids the problem of having one outlier sample in one channel prevent the tile from getting compressed by causing it to fail the threshold comparison test. The advantage of this more robust mechanism for performing threshold comparisons in lossy compression systems is that it maximizes compression as compared to conventional methods and increases compression success rate. Using a conventional method of performing threshold comparison would result in one outlier value in any channel of a pixel (or cluster) preventing the tile from being compressed and, thereby, resulting in increasing the bandwidth strain on the system.

The averager unit 376, like the threshold comparison unit 372, divides each channel into an equality field and a threshold field. The equality field is assumed to be equal and the threshold field is averaged with the other sample channel values (or sample cluster channel values) to produce combined color data (or final color data) for the tile. The field division is identical to that in the threshold comparison unit 372. Stated differently, the threshold field is summed across all the samples for a pixel by the averager unit 376 and the sum is divided by the number of samples in the pixel by unit 376. When sample clusters are used, the threshold field is simply summed across a sample cluster and the sum is divided by the number of samples in the cluster.

The combined value for each channel is placed back in line with the equality field creating a final color (or compressed color) value for each pixel or sample cluster. The tile color data selector 378 selects either the final color (or compressed color) value for each cluster as the output, thus achieving a compression factor equal to the number of samples in the cluster. Alternatively, the tile color data selector can select the original color value for each sample as the output color value if the cluster cannot be compressed for any reason.

In another embodiment the averager unit 376 would add the minimum value of a channel in a cluster, to the maximum value of a channel in a cluster and divide by 2 (taking the mean average) to determine the final color value for the tile. The advantage to this is that it would reduce any loss from compression to the lowest maximum error for any sample (or pixel) in the group.

In one embodiment, although the threshold comparison unit 372 and the averager unit 376 may both be configured to operate on floating point data, no floating point math operations are performed, e.g., subtraction of exponent, normalization of mantissas, and the like. Since the exponents must be identical, the 8 lsbs of the mantissa are treated as integers and the averager unit 376 performs integer-based averaging. Also note that the combined color values for each channel cannot be any greater than the maximum of the different sub-pixel sample values, thus no bits need to be carried from the threshold field to the equality field when combining.

Figure 7B:
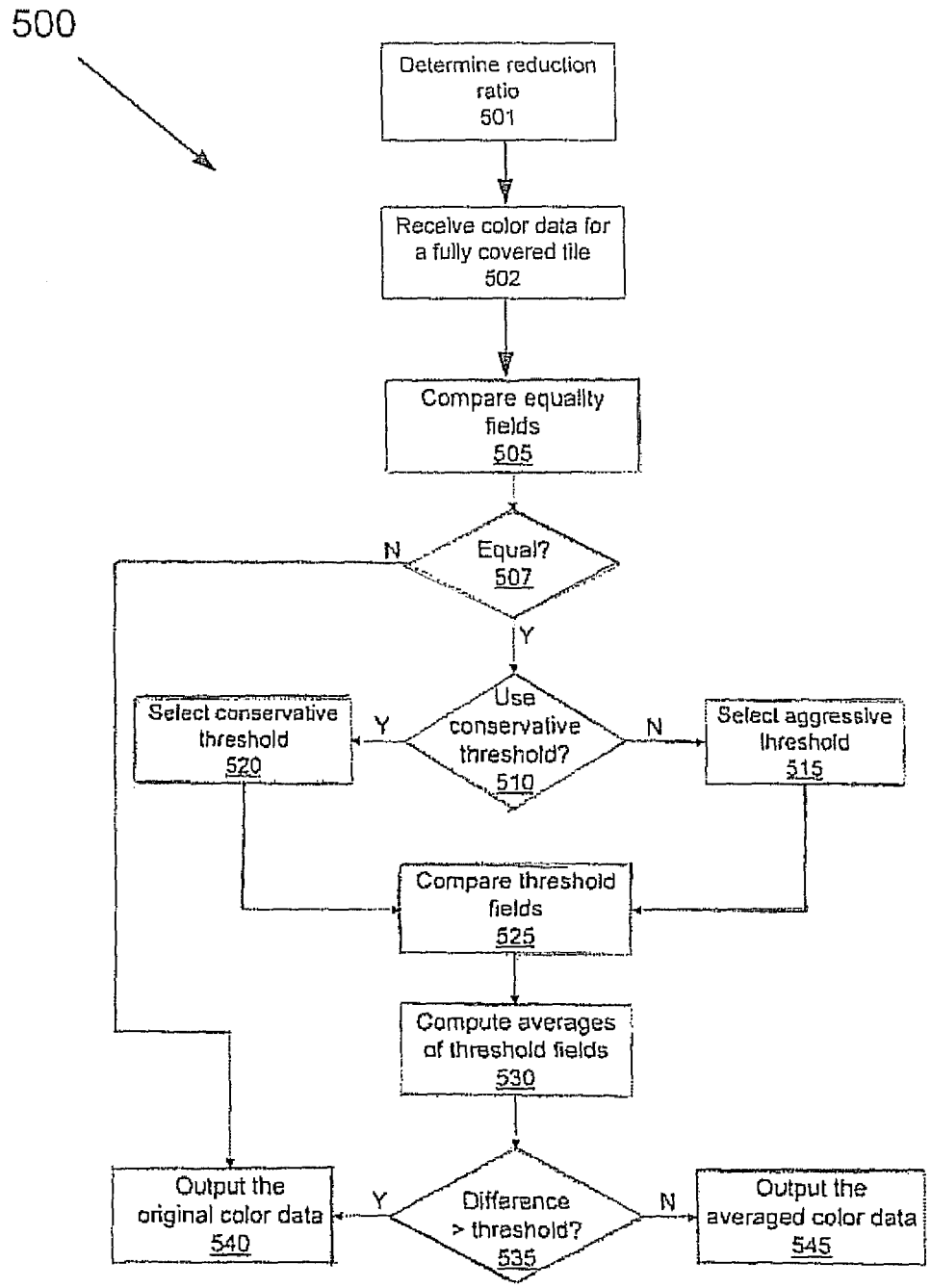
FIG. 7B is a flow diagram of an exemplary method for compressing color data, according to one embodiment of the present invention.

FIG. 7B depicts a flowchart of an exemplary process 500 of for method steps for compressing color data according to an embodiment of the present invention. The invention, however, is not limited to the description provided by flowchart 500. Rather, it will be apparent to persons skilled in the relevant art(s) from the teachings provided herein that other functional flows are within the scope and spirit of the present invention. Flowchart 500 will be described with continued reference to exemplary embodiments described above, though the method is not limited to those embodiments.

At step 501, the reduction ratio for compression is determined. In one embodiment, the system may attempt compression methods in parallel and have the method yielding the highest compression ratio succeed. Accordingly, in such an embodiment, the reduction ratio may be determined at a later step.

At step 502, the compression unit 375 receives the original color data for a fully covered tile. At step 505 the threshold comparison unit 372 compares the equality fields (the first portion of the color data) to produce an equality comparison result. The equality comparison is performed for each pixel or sample cluster to produce the equality comparison result for the tile. At step 507 the threshold comparison unit 372 determines if the equality comparison result indicates that the first portion of the color data includes equal values across each channel of each sample within a pixel or sample cluster, and, if so, then the threshold comparison unit 372 proceeds to step 510. Otherwise, the tile color data selector 378 selects the original color data for output as the output color data.

At step 510 the threshold comparison unit 372 uses a heuristic value, e.g., "All Covered All Hit Once," provided by the control unit 380 to determine if a conservative threshold should be used. If All Covered All Hit Once is false, indicating that a conservative threshold should be used, then at step 520 a conservative threshold value is selected by the threshold comparison unit 372. If All Covered All Hit Once is true, indicating that a conservative threshold should not be used, then at step 515 an aggressive threshold value is selected by the threshold comparison unit 372. At step 525 the threshold comparison unit 372 uses the selected threshold value (aggressive or conservative) to compare the threshold fields (second portion of the color data).

At step 530 the averager unit 376 computes the combined values of the threshold fields (second portion of the color data). At step 535 the threshold comparison unit 372 produces a threshold comparison result that is provided to the tile color data selector 378. A true value for the threshold comparison result indicates that all of the per-channel differences for the samples are less than or equal to the selected threshold value and a false value for the threshold comparison result indicates that at least one of the per-channel differences for the samples is not less than or equal to (is greater than) the selected threshold value. When the value provided to the tile color data selector 378 is true, at step 545 the computed compressed color data is selected for output as the output color data for the tile. Stated differently, tile color data selector 378 selects the final color (or compressed color) value for each tile or cluster as the output, thus achieving a compression factor equal to the number of samples in the tile or cluster respectively. When the value provided to the tile color data selector 378 is false, at step 540 the original color data for each sample that was received by the compression unit 375 is selected for output as the output color data for each sample in the tile or cluster. Note that steps 525 and 530 may be performed in parallel, with the result of the threshold test determining whether to output the computed combined color data or the original color data.

Figure 7C:
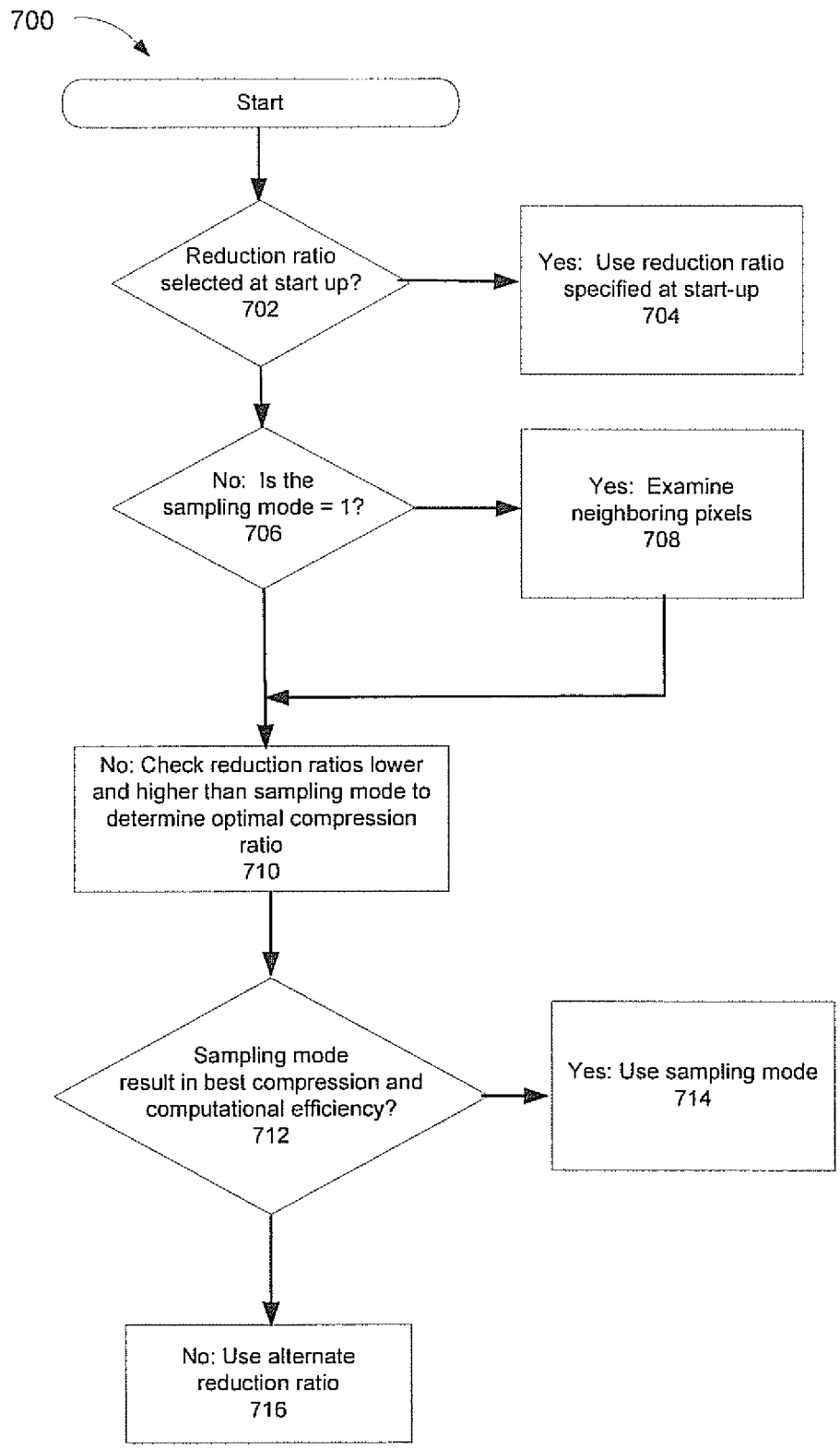
FIG. 7C is a flow diagram of an exemplary method for determining the reduction ratio according to one embodiment of the present invention.

FIG. 7C is a flow diagram of an exemplary method 700 for determining the reduction ratio according to one embodiment of the present invention. The invention, however, is not limited to the description provided by flowchart 700. Rather, it will be apparent to persons skilled in the relevant art(s) from the teachings provided herein that other functional flows are within the scope and spirit of the present invention. Flowchart 700 will be described with continued reference to exemplary embodiments described above, though the method is not limited to those embodiments.

Flowchart 700 provides a more detailed illustration of how the reduction ratio is determined at step 501 of flowchart 500. At step 702, the control unit 380 determines if the reduction ratio was selected by the software or user at system start up. If the reduction ratio was selected by software at start up, then at step 704, the control unit passes on that value to the compression unit 375 and no extra bits need to be stored within compression state 382 for an alternate compression ratio. The reduction ratio chosen at start-up can be independent of the sampling mode. The software or the user can choose a ratio that is different from the sampling mode.

If the reduction ratio was not selected at start up, then at step 706, the control unit 380 determines if the sampling mode specifies only one sub-pixel sample per pixel. If the reduction is being performed on an aliased surface, then neighboring pixels are checked at step 708 to determine if a higher compression scheme, e.g. 2:1, 4:1 or 8:1 could be used. For instance, if there is little color variation in the image because the picture is of a blank wall, then neighboring pixels can be used to increase the compression ratio without sacrificing image quality.

At step 710, the control unit evaluates computational and compression performance of reduction ratios higher and lower than the sampling mode to determine if an alternate compression ratio will result in better performance. At step 712, the control unit determines if a reduction ratio either higher or lower than the sampling mode will result in either better compression performance or computational efficiency than using the sampling mode itself.

If an alternate reduction ratio provides better performance, then at step 716, the control unit will set a status bit in the compression state and store the reduction ratio value in the compression state. The compression unit 375 will subsequently use this value to perform compression. If not, then the same reduction ratio as the sampling mode is used, and at step 714 the compression unit 375 simply uses the sampling mode value stored in compression state 382 to perform compression.

Figure 7D:
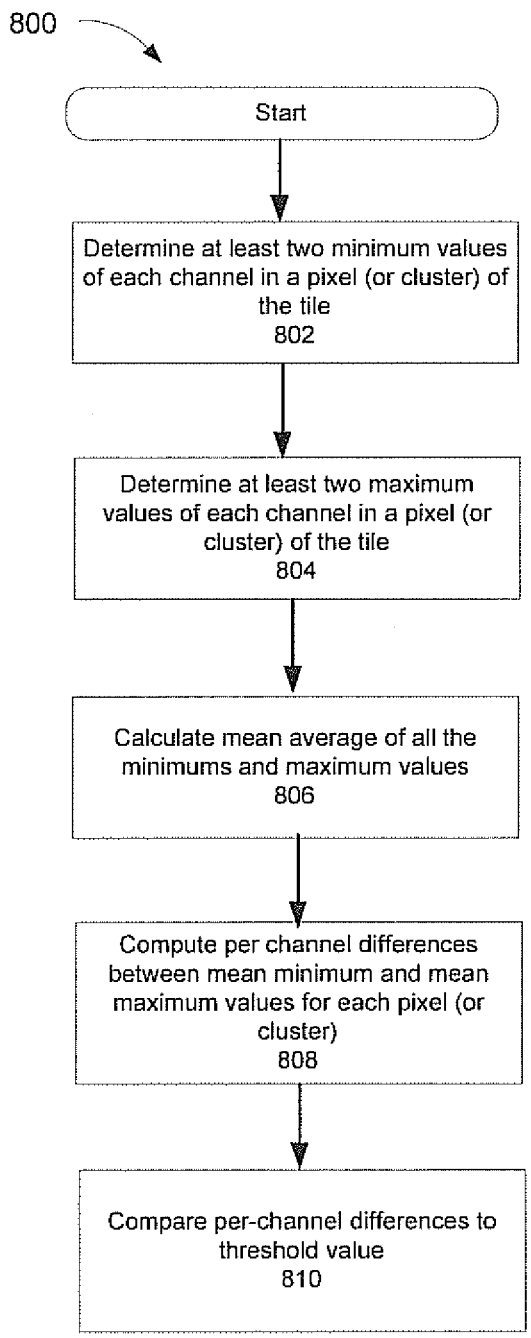
FIG. 7D is a flow diagram of an exemplary method for performing threshold comparisons according to one embodiment of the present invention.

FIG. 7D is a flow diagram of an exemplary method for performing threshold comparisons according to one embodiment of the present invention. The invention, however, is not limited to the description provided by flowchart 800. Rather, it will be apparent to persons skilled in the relevant art(s) from the teachings provided herein that other functional flows are within the scope and spirit of the present invention. Flowchart 800 will be described with continued reference to exemplary embodiments described above, though the method is not limited to those embodiments.

At step 802, the threshold comparison unit 372 determines at least two minimum sample values for each channel in a pixel (or cluster). At step 804, it then determines at least two maximum sample values for each channel in a pixel (or cluster). At step 806, it calculates the mean average of the minimum samples values and the mean average of the maximum sample values for each channel. At step 808, it calculates the difference between the mean maximum value and the mean minimum value for each channel of each pixel (or cluster) in the tile to produce per-channel differences.

Finally, at step 810 the per-channel differences are compared to the threshold value. Subsequently, the tile containing the pixels (or clusters) is compressed if all the per-channel differences are within the threshold value for all of the pixels or sample clusters in the tile.

Visual artifacts are avoided during the compression of the color data since the combined sub-pixel color components for each pixel (or combined sample cluster components) are selected as the output color data based on the equality comparison and the threshold comparison. The fields included in the first portion of the color data and the second portion of the color data are determined based on the color format. The equality comparison and threshold comparisons allow for compression of color data with small differences, compression of color data with large differences, and compression of color data with no differences (lossless compression). Importantly, a heuristic may be used to ensure that visual artifacts are not introduced when the color data is compressed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A processor implemented method for compressing framebuffer data, the method comprising:
   determining a reduction ratio for framebuffer data in a tile comprising multiple samples;
   comparing a first portion of the framebuffer data for each of the multiple samples to determine an equality comparison result;
   comparing a second portion of the framebuffer data for each of the multiple samples to compute per-channel differences therefor and testing the per-channel differences against a threshold value to determine a threshold comparison result; and
   compressing the framebuffer data for the tile to produce output framebuffer data for the tile,
   wherein the determining, the comparing a first portion, comparing a second portion, and the compressing are performed utilizing a processor of a computing device.

2. The method of claim 1, wherein the reduction ratio is independent of a sampling mode, wherein the sampling mode is related to the number of samples within each pixel in the tile.

3. The method of claim 2, wherein the reduction ratio is greater than the sampling mode.

4. The method of claim 3, wherein the compressing is based on the reduction ratio, the equality comparison result and the threshold comparison result and further comprises using framebuffer data from neighboring pixels to produce output framebuffer data for each pixel in the tile.

5. The method of claim 2, wherein each pixel within the tile contains only one sample.

6. The method of claim 5, wherein the reduction ratio is selected from the group comprising: 2:1; 4:1; and 8:1.

7. The method of claim 1, wherein the testing the per-channel differences against a threshold value to determine the threshold comparison result comprises:
   determining a mean average of at least two minimum sample values and a mean average of at least two maximum sample values in each channel in each sample cluster of the tile;
   computing the difference between the mean average minimum value and the mean average maximum value for said each channel in each sample cluster; and
   comparing the computed per-channel difference to a corresponding threshold value for the channel.

8. The method of claim 1, wherein the output framebuffer data for the tile is a mean average of a minimum sample value and a maximum sample value in each channel in each sample cluster of the tile.

9. The method of claim 1, wherein the framebuffer data is selected from the group comprising: color data, depth data and stencil data.

10. The method of claim 2, further comprising computing a per-channel final value for each sample cluster in the tile based on channel values of each sample in the second portion of the framebuffer data to produce final framebuffer data for each sample cluster in the tile, wherein the number of samples in each sample cluster is based on the reduction ratio.

11. The method of claim 10, wherein the compressing comprises:
   determining, for all sample clusters in the tile, that the equality comparison result indicates that the first portion of the framebuffer data for each sample cluster in the tile includes equal values across each channel of each sample in the sample cluster;
   determining, for all sample clusters in the tile, that the threshold comparison result indicates that all per-channel differences computed for each sample cluster in the second portion of the framebuffer data are less than or equal to the threshold value; and
   selecting final framebuffer data for each sample cluster to produce the output framebuffer data for the tile.

12. The method of claim 11, further comprising setting the threshold value to zero to enable lossless compression, wherein, when decompressed, the combined framebuffer data equals the input framebuffer data.

13. The method of claim 8, wherein the compressing comprises:
   determining, for all sample clusters in the tile, that the equality comparison result indicates that the first portion of the framebuffer data for each sample cluster in the tile includes equal values across each channel of the multiple samples within the sample cluster;
   determining that the threshold comparison result indicates that at least one of the per-channel differences computed for each sample cluster in the second portion of the framebuffer data is greater than the threshold value; and
   selecting the framebuffer data received for each of the sample clusters in the tile to produce the output framebuffer data for the tile.

14. A non-transitory computer readable storage medium storing instructions that, when executed by a processor, cause the processor to compress framebuffer data, by performing the operations of:
   determining a reduction ratio for framebuffer data in a tile comprising multiple samples;
   comparing a first portion of the framebuffer data for each of the multiple samples to determine an equality comparison result;
   comparing a second portion of the framebuffer data for each of the multiple samples to compute per-channel differences therefor and testing the per-channel differences against a threshold value to determine a threshold comparison result; and
   compressing the framebuffer data for the tile to produce output framebuffer data for the tile.

15. The computer readable storage medium of claim 14, wherein the reduction ratio is independent of a sampling mode, wherein the sampling mode is related to the number of samples within each pixel in the tile.

16. The computer readable storage medium of claim 15, wherein the reduction ratio is greater than the sampling mode.

17. The computer readable storage medium of claim 16, wherein the compressing is based on the reduction ratio, the equality comparison result and the threshold comparison result and wherein said operations further comprise using framebuffer data from neighboring pixels to produce output framebuffer data for each pixel in the tile.

18. A system for compressing framebuffer data, the system comprising:

a processor configured to determine a reduction ratio for framebuffer data in a tile comprising multiple samples, wherein the processor comprises a compression module configured to:
  compare a first portion of the framebuffer data for each of the multiple samples to determine an equality comparison result;
  compare a second portion of the framebuffer data for each of the multiple samples to compute per-channel differences therefor and testing the per-channel differences against a threshold value to determine a threshold comparison result; and
  compress the framebuffer data for the tile based on the reduction ratio, the equality comparison result and the threshold comparison result to produce output framebuffer data for the tile.

19. The system of claim 18 wherein the reduction ratio is independent of a sampling mode, wherein the sampling mode is related to the number of samples within each pixel in the tile.

20. The system of claim 19, wherein the reduction ratio is greater than the sampling mode.

21. The system of claim 20, wherein the compression module is further configured to use framebuffer data from neighboring pixels to produce output framebuffer data for each pixel in the tile.

22. The system of claim 19, wherein each pixel within the tile contains only one sample.

23. The system of claim 22, wherein the reduction ratio is selected from the group comprising: 2:1; 4:1; and 8:1.

24. The system of claim 19, wherein the reduction ratio is selectable by software at system start-up.

25. The system of claim 19, wherein the reduction ratio is determined dynamically in real-time based on computational and compression performance factors.

26. The system of claim 19, wherein the compression module is further configured to:
  determine a mean average of at least two minimum sample values and a mean average value of at least two maximum sample values in each channel in each sample cluster of the tile;
  compute the difference between the mean average minimum value and the mean average maximum value for said each channel in each sample cluster; and
  compare the computed per-channel difference to a corresponding threshold value for the channel.

27. The system of claim 19, wherein the output framebuffer data for the tile is a mean average of a minimum sample value and a maximum sample value in each channel in each sample cluster of the tile.

* * * * *